Sept. 25, 1945.    C. S. JOHNSON    2,385,707
THIEF SIGNAL
Filed May 1, 1942    2 Sheets-Sheet 1
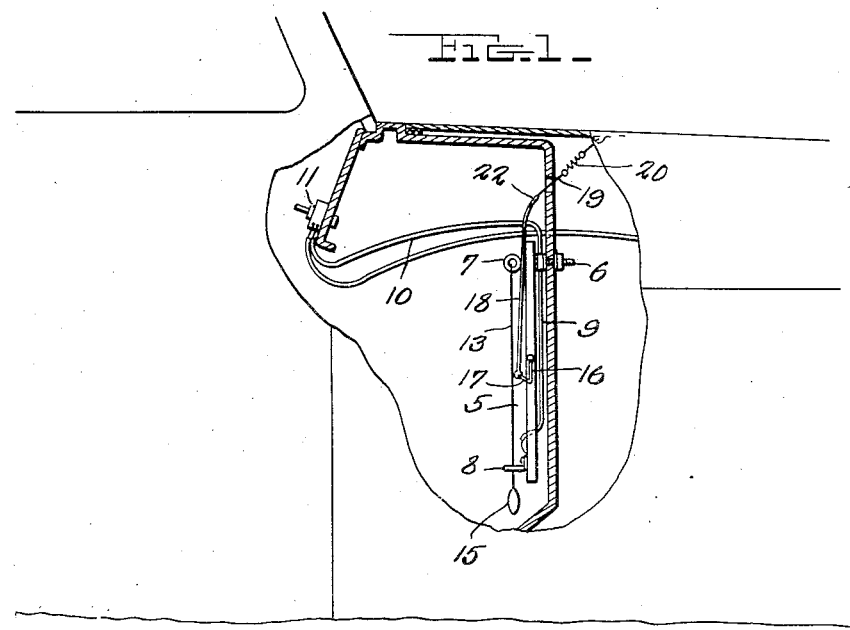
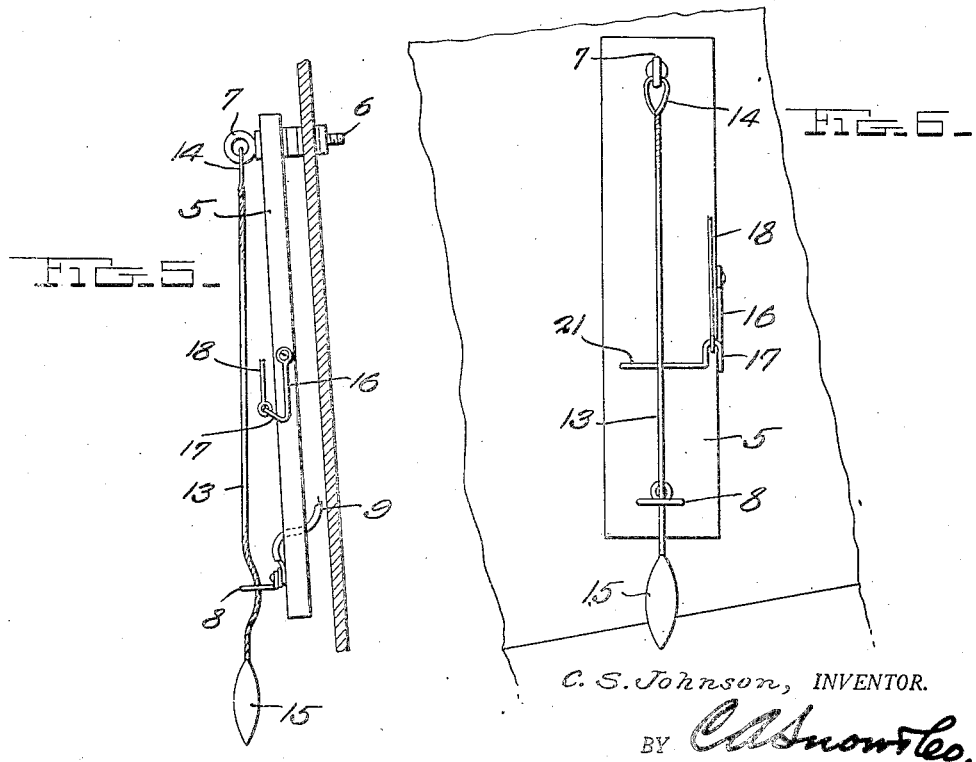
C. S. Johnson, INVENTOR.

Sept. 25, 1945.   C. S. JOHNSON   2,385,707
THIEF SIGNAL
Filed May 1, 1942   2 Sheets-Sheet 2
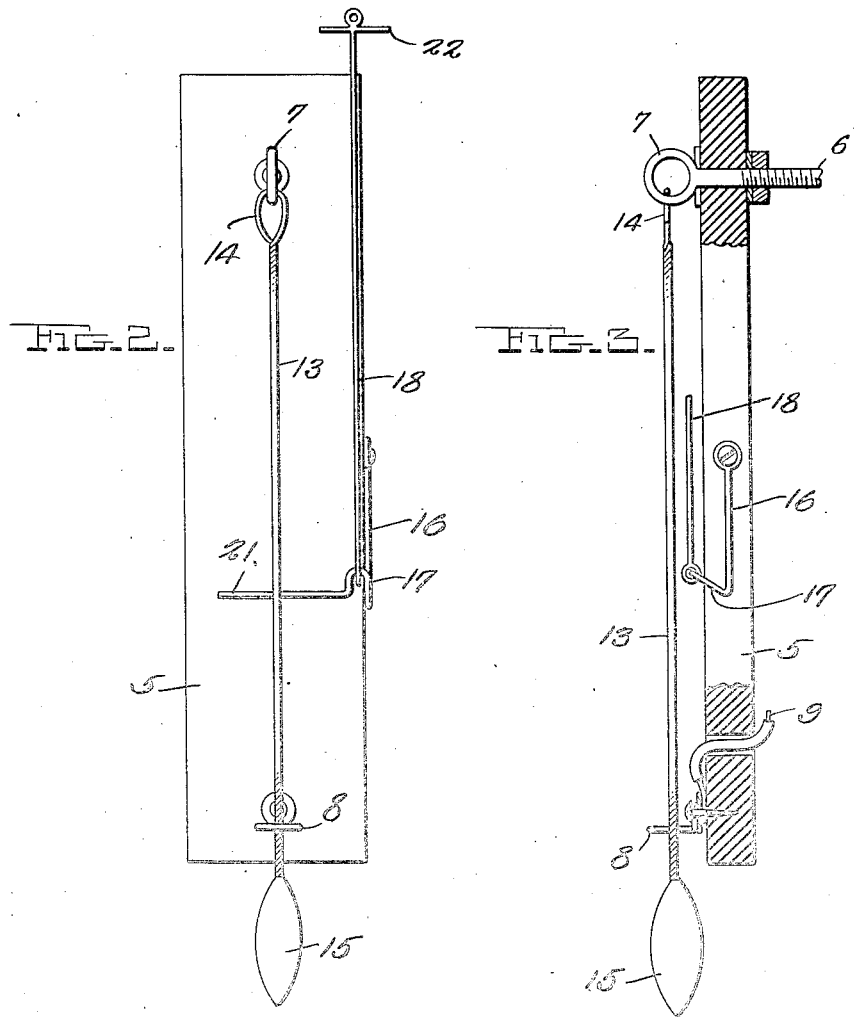
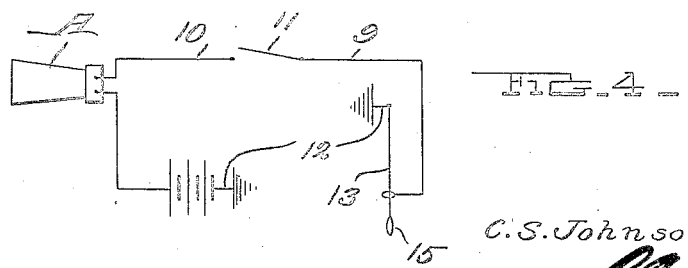
C. S. Johnson, INVENTOR.

Patented Sept. 25, 1945

2,385,707

UNITED STATES PATENT OFFICE 2,385,707

THIEF SIGNAL

Charles S. Johnson, Albany, Ga., assignor of fifty per cent to H. H. Williamson

Application May 1, 1942, Serial No. 441,356

1 Claim. (Cl. 200—52)

This invention relates to a thief signal, designed primarily for use in connection with motor vehicles, the primary object of the invention being to provide an electric signalling mechanism connected in circuit with the usual horn of a vehicle, to sound the horn intermittently, or continuously, when an unauthorized person attempts to move the vehicle.

An important object of the invention is to provide a device of this character which will be exceptionally sensitive, to the end that the signal will operate under the slightest vertical movement of the vehicle, should an attempt be made to jack up the vehicle to remove a wheel or tire therefrom.

A further object of the invention is the provision of means for causing the operation of the signal in the event that an unauthorized person endeavors to raise the hood of the vehicle, in an attempt to gain access to the control mechanism to render the control mechanism inoperative.

Still another object of the invention is to provide means whereby the switch mechanism of the device may be adjusted, so that the vehicle equipped with the device may be parked on side hills, or sloping surfaces.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is an elevational view of the switch, and illustrating the switch as installed on the dashboard of a motor vehicle.

Figure 2 is a front elevational view of the switch.

Figure 3 is a side elevational view of the switch, portions of the main support or body of the switch being broken away and shown in section.

Figure 4 is a diagram illustrating the circuit between the switch and horn of the motor vehicle.

Figure 5 is a side elevational view of the switch, illustrating the manner of adjusting the arm of the switch, so that the vehicle may be parked on a sloping surface.

Figure 6 is an elevational view, illustrating the switch as having been moved to a position where the vehicle may be parked on a side hill.

Referring to the drawings in detail the device comprises a body portion indicated generally by the reference character 5, the body portion being substantially long and provided with an opening near the upper end thereof, through which the securing bolt 6 extends. This securing bolt 6 is formed with an eye 7 and is insulated with respect to the body portion 5. The bolt 6 provides a support for the device, and as shown, extends through the dashboard of the vehicle. The connection between the body portion 5 and bolt 6, is such that under normal conditions, the body portion will be held against movement. However, the body portion may be tilted to the right or left, by merely grasping the lower end of the body portion and moving it the desired distance. Thus it will be seen that the position of the body portion 5 may be changed with respect to the vertical.

Secured to the body portion 5, at a point near the lower end thereof, is a contact ring 8 which is in circut with the horn A of the vehicle, through the wires 9 and 10, there being provided a switch 11 in the circuit for closing the circuit. The ground wire of the circuit is indicated by the reference character 12.

The reference character 13 designates the movable arm of the switch, which is formed with a loop 14 at its upper end, extended through the eye 7, as clearly shown by the drawings. The lower end of the movable arm 13 extends through the contact ring 8 and is held normally in a position substantially centrally of the contact ring 8, by the weight 15 that is secured to the free end of the arm 13 to act as a pendulum.

Secured to one edge of the body portion 5, is a pivoted arm 16 that has an upwardly extended end 17 to which the link 18 is connected, the link 18 being in turn, connected to the wire 19 which is connected to the under surface of the hood of the vehicle. A spring 20 is interposed in the wire, to lend resiliency to the connection and insure against displacement of the wire with respect to the hood, should the hood be raised suddenly.

The extremity of the upwardly extended portion 17 of the arm 16, extends laterally, providing a finger 21, that rests between the movable arm 13, and the body portion, under normal conditions. Thus it will be seen that when the hood is elevated, and the link 18 is drawn upwardly, the finger 21 will be moved outwardly against the arm 13, swinging the arm against the contact ring to complete the circuit to the horn A.

It might be further stated that a cross arm 22 is provided at the upper end of the link 18 and provides a stop to prevent the link from being drawn too far through the opening of the dashboard of the vehicle.

Should it be desired to park the vehicle on a side hill, it is only necessary to move the body portion 5 to a vertical position, or to a position wherein the arm 13 will swing in the center of the contact ring. It should be obvious that after this adjustment has been made, any movement of the vehicle will cause the arm 13 to engage the contact ring, completing the circuit to the horn.

While the bolt 6 provides means for supporting the arm 13, the bolt also provides the ground for the circuit completed by the arm 13 engaging the contact ring.

Should it be desired to adjust the arm 13 towards or away from the dashboard of the vehicle, in parking the vehicle up or down hill, the arm 13 may be bent in a manner as shown by Fig. 5, so that when the arm hangs vertically, the arm will clear the contact ring.

From the foregoing it will be seen that due to the construction shown and described, the arm 13 will move to engage the contact ring when the vehicle on which it is supported, is moved in practically any direction, the slightest degree, to the end that it would be impossible to jack up the automobile to remove a tire or wheel without causing a signal.

What is claimed is:

A circuit closer comprising a support, an eye bolt extending through the support adjacent to the upper end thereof, said eye bolt adapted to extend into the dash board of a motor vehicle, securing the support to the dash board, a contact ring secured to the support, a contact arm constructed of semi-rigid pliable material, pivotally connected with the eye bolt, the lower end of the contact arm extending through the contact ring and adapted to be bent, providing an offset portion within the contact ring, normally preventing the contact of the contact arm and contact ring when the motor vehicle is parked in an inclined position, and a weight on the end of the contact arm extended through said contact ring, said weight adapted to swing the contact arm into contact with the contact ring when the motor vehicle is moved out of its normal inclined position.

CHARLES S. JOHNSON.